Patented Sept. 19, 1939

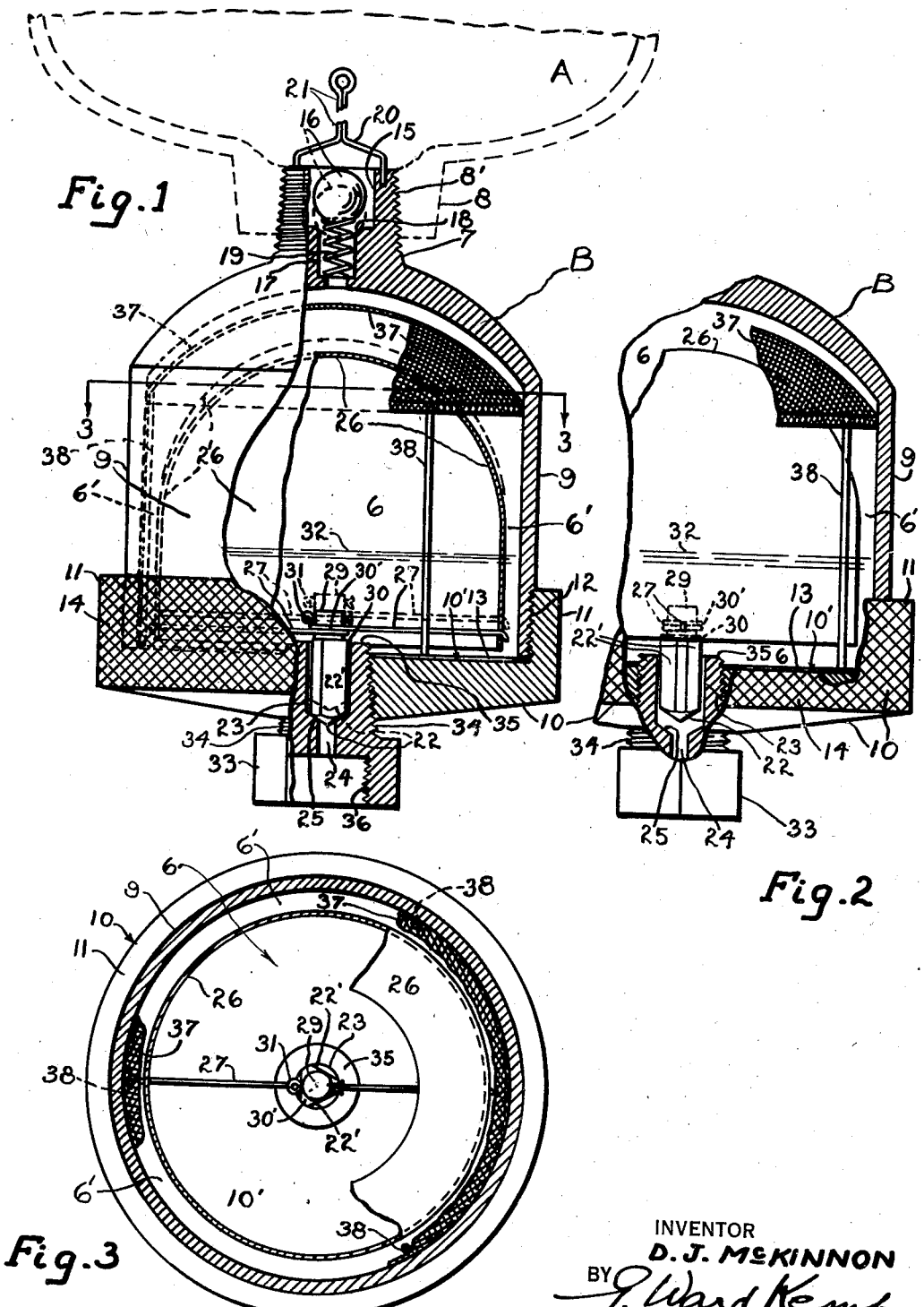

2,173,307

UNITED STATES PATENT OFFICE 2,173,307

DEVICE FOR DRAINING WATER FROM AIR TANKS

Donald J. McKinnon, Seattle, Wash.

Application February 21, 1939, Serial No. 257,647

5 Claims. (Cl. 137—103)

This invention relates to devices for ejecting and draining water from air tanks, particularly for supplying air under pressure for automobile use, free from moisture.

In the operation of tanks for storing air under compression it has been found that various quantities of water and liquid will be condensed from the air within the tank and accumulate in the lower portion thereof. When the compressed air is drawn from such tanks, moisture will be carried thereby and when used for inflating tubes for tires, it has been found that such moisture in the air tends to heat when the tires are used and injure the same. Again when compressed air is used from such tanks for setting brakes for braking purposes on various vehicles, particularly automobile trucks for highway travel that accidents are caused by the freezing of the moisture in the tanks and so preventing the brakes from acting or setting when desired. The brakes under such conditions refuse to respond to the actions or operations of the driver by reason of the ice, and such frozen conditions being generally unknown by the driver until attempts are made to stop the truck as desired.

Petcocks have been tried for draining accumulated water and moisture from such air tanks, but the opening of such petcocks is frequently omitted by the operators when necessary, and on other occasions such petcocks become broken from the tanks in rough usage of the trucks or tanks and air from the tanks is thereby permitted to escape and generally without the knowledge of the operator until too late when the vehicle cannot be stopped.

It is therefore an object of this invention to provide a device for continually draining all the water into a chamber from air tanks that may be condensed in such tanks and without the loss of any of the air therefrom or decrease of air pressure in the tank. A further object is to provide a check valve in the base of the tanks to permit the escape of water therefrom and to prevent the escape of air from the tanks in case the chamber is broken away, and to provide for the removal of the chamber for cleaning without the loss of air from the tanks. A still further object is to provide such a chamber with a well needle valve at the base thereof and a float connected to the needle valve for automatically lifting such valve and for discharging the water from the chamber when a predetermined amount thereof has gathered therein. The said chamber to be also provided with a removable bottom cap for assembling the float and for removal of accumulated sediment, said cap to be provided with an adjustable plug therein for draining the chamber and said plug provided with a valve seat for the needle valve and adapted to extend through said cap to provide a wall above the same to prevent sediment from entering the well and clogging the needle valve and said plug being removable for cleaning, said cap, and for renewing said valve seat all without loss of air from the tank.

With these and other objects to be hereinafter stated I have illustratively exemplified my invention by the accompanying drawing of which:

Figure 1 is an elevation view of the assembled draining device attached to an air tank and having parts broken away.

Figure 2 is a fragmentary detail view of a portion of the chamber and the needle valve.

Figure 3 is a plan of a portion of the chamber and parts therein taken on line 3—3 of Fig. 1.

Like characters on the different figures represent like parts.

Letter A, represents the lower portion of any tank for storage of air under pressure to be used for various purposes and particularly for inflating tire tubes and for operating brakes on automobiles and trucks. B, represents a housing or enclosure to provide chamber 6, for gathering and discharging water from the tank. The chamber housing is connected by a neck 7, which is attached to the base 8, of the tank as by threads 8' and is thereby sustained beneath the tank.

The side walls 9, of the chamber are preferably circular and closed at the bottom by a floor plate or circular cap 10. The cap carries a peripheral flange 11, which is adjustably connected to the lower walls by threads 12. A gasket 13, is interposed between the cap and the lower edges of the walls to assure a water tight joint under pressure. A roughened surface 14, on the flange facilitates the removal of the cap for assembling the contents of the chamber and for removing sediment, and also for tightening the cap as desired.

The supporting neck is tubular and provided with two counterbores as 15, to retain a ball 16 freely disposed therein, and a smaller bore 17, to provide a seat 18, for the ball at the top thereof and also to provide a cavity and seat for a light coil spring 19, there disposed for normally supporting the ball above its seat. In event of accidental breaking away of the housing during rough road encounters, the air pressure normally carried in the tank immediately depresses the ball upon the seat and prevents loss of air from the tank. In other cases where it may be necessary to remove the cap from the housing for assembly of parts therein or for cleaning sediment therefrom, the ball again prevents loss of air from the tank.

A wire cage or bail 20, is extended over the ball to prevent displacement thereof from the bore 15, by jolting of the truck, and one or more wires as 21, may be projected upward from the cage into the tank to any desired length. As the housing beneath the tank is frequently exposed to cooler surroundings than the tank, the chamber becomes colder than the tank and the wires conduct the lower temperature up by the cage and into the tank and facilitates a rapid condensation of moisture from the air within the tank. The said ball check valve normally permits all water from the tank to flow freely down into the chamber so that regardless of freezing temperature no ice will be formed in the tank and the air therefrom will be dry for safe use in tire tubes and for braking services.

In order to regulate the discharge of the water from the chamber without loss of air from the tank, a needle valve body or core 22, is slidably disposed in a guide well 23. The well is provided with an outlet 24, and a seat 25, on which the valve normally rests. A float 26, for lifting this valve is slidably mounted in the chamber above. The float is formed of thin light metal and open across the bottom and filled with air for easy raising thereof and is normally supported on a cross wire 27. Said wire 27, is extended across the mouth or bottom of the float and is freely connected centrally around a neck 29 and above a shoulder 30, on the upper portion of the valve 22. Said wire is maintained on the neck by a collar 30' and cotter pin 31, for easy assembly and operation. Normally the lower edges around the mouth of the float rest near the floor of the cap, but when a predetermined quantity of water, indicated as 32, has gathered in the chamber, the float is raised thereby and the valve 22, is accordingly raised from its seat 25. When the said valve 22, is so raised a portion of the water escapes from the chamber through the outlet beneath the valve until the float is lowered to normal position and the valve 22, again seated. Several flattened faces 22' around the body of the valve 22, permit the flow of water around the stem when so raised.

In order to facilitate the cleaning of the chamber without removal of said floor of the chamber and also to provide for removal of the valve seat for said needle valve, a plug 33, is normally connected as by threads 34, centrally through the cap. The upper end of the plug is preferably projected through the chamber a short distance above the level of the floor thereof and so provides a flange 35, or wall, to prevent any sediment that may have gathered on the bottom of the chamber from entering the well and so clog the valve 22. The plug also provides the well and seat for the valve 22, and may be easily removed without removal of the cap to facilitate the renewal of the valve seat. The lower end of the plug may be provided with a threaded connection 36, for any desired drain hose for disposal of water from the chamber when on a car in a garage. To arrest the falling of possible metallic sediments or particles from the tank upon the floor of the chamber or into the well of the valve, a canopy 37, of suitable fine mesh screen may be supported above the float as by wire posts 38.

It will be readily understood that the device so described will aid in condensation of the moisture from the air under pressure in the tank and will facilitate the escape of all water from the tank and preserve the air therein free from moisture and safe for uses desired. It will be further understood that the cap on the chamber and plug in the cap may be severally removed for assembly cleaning or repairing or removals without the loss of pressure of air in the tank.

While I have specifically described certain structure for my device I do not limit my invention to the specific details shown but desire to claim the invention broadly as within the scope of the claims attached.

Having described my invention I claim as new:

1. A device for automatically drawing water from a pressure air tank for automobiles, comprising, a chamber adjustably connected to the bottom of a tank, a check valve mounted in the base of the tank to provide for the passage of water from the tank into the chamber and to prevent the escape of air from the tank when the chamber is opened, a needle valve mounted in the base of the chamber and normally closed on a seat, a float disposed within the chamber, connected with the needle valve and adapted to rise when a predetermined quantity of water has accumulated in the chamber and to thereupon lift and open said needle valve to facilitate the discharge of water from the chamber, a cap on the bottom of the chamber adapted to be removed for opening the same and for assembling and cleaning parts within said chamber, a plug removably connected to said bottom cap provided with a well and seat for the needle valve, the top of said plug adapted to project above the bottom of said chamber and to prevent sediment from such bottom entering said well and valve seat, the said plug adapted to be removed for refinishing the valve seat without escape of air from the tank.

2. A device for automatically drawing water from an air pressure tank for use with automobiles, comprising, a chamber connected with and dependent from the tank, a check valve in the base of the tank for discharge of water therefrom and adapted to close and prevent the escape of air from the tank when the chamber is opened, a needle valve slidably mounted in the base of the chamber, a float mounted in the chamber and connected with the needle valve and adapted to lift the same to facilitate discharge of water from the chamber when a predetermined quantity thereof has accumulated therein intermittently, said chamber being provided with a removable bottom cap for assembly of parts and for cleaning within the chamber together with a removable plug projected through the said bottom cap to provide a seat for the needle valve and to prevent sediment in the chamber from clogging the valve.

3. A device with structure described in the preceding claim 2, and provided with a screen canopy supported above the float to intercept the fall of sedimentary particles from the connections above the chamber to the floor below.

4. A device for drawing water from pressure air tanks for automobiles, including a chamber, connected beneath a tank, a check valve in the base of the tank to provide passage of water therefrom and to prevent the release of air from the tank when the chamber is open, a plug removably connected in the base of the chamber, adapted to be disengaged for cleaning the chamber and for refinishing the valve seat in the plug, a valve slidably mounted in said plug for discharge of water from the chamber, a float slidably mounted in the chamber, adapted to lift the last described valve intermittently when a predetermined quantity of water has gathered therein, a base cap on the chamber adapted to be removed for cleaning within said chamber, the said plug being projected above the bottom of said chamber floor to prevent sediment therefrom from entering beneath the seat of said last described valve.

5. A device for drawing water from an air pressure tank, for automobile use, comprising, a chamber removably connected to the tank, a check valve adapted to prevent the escape of air from the tank while water is passing therefrom, a bottom cap on the chamber adapted to be removed for assembling parts within the chamber and for cleaning the same, a plug centrally positioned through the cap, a needle valve and valve seat disposed within the plug, a float slidably mounted in the chamber and adapted to open said last described valve and to close the same intermittently when quantities of water have accumulated in said chamber and pass beneath said valve, said plug adapted to be removed for renewing the said last described valve seat and for cleaning the chamber without the discharge of air from said tank.

DONALD J. McKINNON.